Nov. 29, 1955 C. S. FULLER 2,725,315

METHOD OF FABRICATING SEMICONDUCTIVE BODIES

Filed Nov. 14, 1952

INVENTOR
C. S. FULLER
BY [signature]
ATTORNEY

United States Patent Office 2,725,315 Patented Nov. 29, 1955

2,725,315

METHOD OF FABRICATING SEMICONDUCTIVE BODIES

Calvin S. Fuller, Chatham, N. J., assignor to Bell Telephone Laboratories, Incorporated, New York, N. Y., a corporation of New York Application November 14, 1952, Serial No. 320,359

6 Claims. (Cl. 148—1.5)

This invention relates to the fabrication of signal translating devices and more particularly of semi-conductive bodies, such as germanium and silicon, for such devices.

Semiconductors, such as germanium and silicon, as is now well known, may be of either of two distinct conductivity types, designated N and P types. N type material passes current readily when it is negative with respect to a connection thereto and presents a relatively high resistance when it is positive with respect to a connection thereto. For P type material the reverse is true. As is also known, semiconductive bodies having therein two or more contiguous zones of opposite conductivity types find application in a variety of signal translating devices such as rectifiers, photocells and transistors. Illustrative devices are disclosed in Patents 2,402,661 and 2,402,662 granted June 25, 1946 to R. S. Ohl, 2,569,347 granted September 25, 1951 to W. Shockley and 2,602,211 granted July 8, 1952 to J. H. Scaff and H. C. Theuerer.

The conductivity type is associated with the presence or excess of one class of significant impurity, those resulting in N type being designated donors and those resulting in P type being designated acceptors. The boundary between contiguous N and P type zones is referred to commonly as a PN junction.

One general object of this invention is to facilitate the fabrication of PN junctions in semiconductive bodies, particularly in germanium and silicon bodies. Another object of this invention is to expedite the formation of zones of desired conductivity type at prescribed locations in semiconductive bodies for signal translating devices.

The invention is predicated in part upon the discovery that lithium diffused into germanium or silicon acts as a donor. Further, it has been found that lithium diffuses readily into both germanium and silicon and the depth of diffusion thereof is amenable to control whereby PN junctions can be produced at prescribed locations in bodies initially of P conductivity type.

In accordance with one broad feature of this invention, a body of P type silicon or germanium is heated in the presence of or in contact with lithium under prescribed conditions of temperature and time to effect diffusion of lithium into the body thereby to convert a region of desired depth in the body to N conductivity type.

More specifically, in accordance with one feature of this invention, a body or wire of or containing lithium is placed in contact with a P type silicon or germanium element and the assembly is heated in an inert atmosphere at a temperature between about 500° C. and the melting point of the semiconductor to effect diffusion of lithium into the semiconductor and produce an N zone in the P body.

In accordance with another feature of this invention, a wire containing both lithium and an acceptor is placed in contact with a P type semiconductor and the assembly is treated to cause diffusion of both the lithium and acceptor into the body thereby to produce a region of PNP configuration adjacent the wire. The latter and the associated region find particular application as a collector in transistors.

The invention and the above noted and other features thereof will be understood more clearly and fully from the following detailed description with reference to the accompanying drawing in which.

Figure 1:
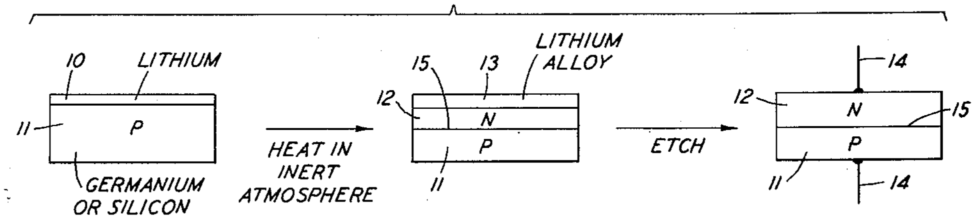
Fig. 1 is a diagram illustrating the fabrication of a relatively large area junction diode in accordance with this invention.

Referring now to the drawing, in the fabrication of a junction diode as illustrated in Fig. 1, a coating 10 of lithium is applied to one face of a wafer or disc 11 of P conductivity type germanium or silicon. The coating may be applied, for example, by condensing lithium from the vapor upon the semiconductor or by dipping the body or wafer in molten lithium, both in an inert atmosphere. The coated body is heated in an inert atmosphere, for example helium or argon, at a temperature between about 500° C. and the melting point of the semi-conductor, i. e., 936° C. for germanium and 1420° C. for silicon, and then is quenched as, for example, by placing it upon a cool steel block.

As a result of the heat treatment, lithium diffuses into the wafer or disc to a depth dependent upon the temperature and time of heating as will be indicated hereinafter and a portion or zone 12 of the semiconductor is converted to N conductivity type thereby to produce a PN junction 15. Also a surface layer 13 of lithium-germanium or lithium-silicon alloy is formed. This may be removed by placing the body in water after which the PN boundary region is etched with an etchant composed of concentrated nitric acid, 1 part by volume, hydrofluoric acid 1 part, and water 1 part. Following the etching, substantially ohmic connections to the zones 11 and 12 are made as by affixing wires 14 thereto, for example by fusion of an antimony doped gold wire to the N-side and indium doped gold wire to the P-side. It will be understood, of course, that the disc or wafer may be cut or diced to form a plurality of diodes before the etching step.

It has been determined that the diffusion constant for lithium in germanium is given by the relation $$D=0.0013 \exp(-10700/RT) \quad (1)$$

where $D$=diffusivity in cm.$^2$/second
$R$=1.98 calories
$T$=absolute temperature Thus, at 900° C., $D=1.6\times10^{-5}$ cm.$^2$/sec. For lithium in silicon, the diffusion constant is somewhat lower than that given above for germanium being $3.6\times10^{-6}$/sec. at 900° C. whereas the activation energy is approximately 16,000 calories.

The time of treatment requisite to produce an NP junction at a desired position in a disc or wafer by diffusion of lithium can be determined for a given temperature in the following manner making use of the known resistivities and diffusivities of lithium in the semi-conductor. At the junction, the donor and acceptor concentrations are equal. The acceptor concentration in a given specimen is determinable from the relation $$C_A = \frac{1}{\rho \mu_h q} \qquad (2)$$

where $C_A$=the acceptor concentration in cm.$^{-3}$
$\rho$=resistivity of the P type disc or wafer in ohm cm.
$\mu_h$=mobility of holes in the disc or wafer in cm.$^2$ per voltage seconds.
$q$=the electronic charge in coulombs.

The donor concentration at a distance X from the surface from which the lithium is diffused is given by the relation $$C_D = C_0 \, erfc \frac{X}{2\sqrt{Dt}} \qquad (3)$$

where $C_D$=concentration of donors at the surface in cm.$^{-3}$
$erfc$=1 minus the error integral.
$t$=time in seconds.
$D$=diffusion constant at the temperature T in cm.$^2$ per second.
$C_0$=surface solubility of lithium in cm.$^{-3}$.

In (3) $C_0$ is known at each temperature from determinations of diffusivity. Consequently this equation may be solved for the required heating time.

An example will indicates the order of magnitude of the temperature and time. A wafer, 0.123 cm. thick, of germanium-gallium material, of P conductivity type and having a resistivity of 1.65 ohm cm. was used. The major faces were ground smooth on plate glass using 600 mesh aluminum oxide in water. One surface was contacted with a foil of lithium 5 mils thick and of sufficient area to cover the wafer. The wafer then was heated at 680° C. in helium for 60 seconds and thereafter quenched. The NP junction was produced at 27.1 mils from the coated surface.

In an example using P type silicon, a wafer of resistivity =0.59 ohm cm. and 60 mils thick by 250 mils in diameter was ground on one surface with No. 600 silicon carbide in water. A similar foil of lithium to that described above was placed on this surface and the combination heated in helium at 900° C. for 120 seconds and quenched on a steel plate. After removing excess lithium in water, the treated wafer was cut in two, etched, and probed for the PN boundary. This was found at 36.5 mils from the silicon surface.

Figure 2:
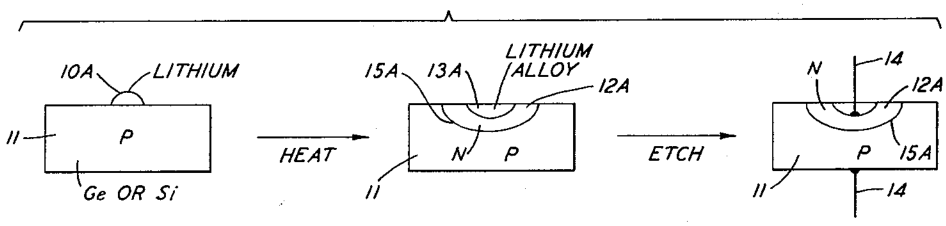
Fig. 2 depicts the manufacture of a relatively restricted area diode.

The invention may be utilized also to produce N zones of limited extent in P type bodies, as illustrated in Fig. 2. A particle 10A of lithium is placed upon a cleaned surface of a P type germanium or silicon body 11 and the assembly heated in an inert atmosphere and then quenched. The lithium diffuses into the body 11 to convert a zone 12A thereof to N type whereby an NP junction 15A is produced. Also formed is an island 13A of lithium-germanium alloy. The body then is etched and wires 14 affixed to the N and P regions as in the manner described hereinabove in the description of Fig. 1.

For a typical case, a particle 10A of lithium was placed on a 50 mil thick wafer 11 of P type germanium having a resistivity of 1.2 ohm cm. and the assembly was heated in helium for 30 seconds at 850° C. and then quenched on a steel plate. The maximum depth of the junction was 23.0 mils. The diode resulting after etching and application of wires exhibited a reverse current of 0.18 milliamp. at 10 volts and of 0.30 milliamp. at 40 volts, and no Zener type breakdown up to 150 volts.

In another example typical of silicon, a wafer 30 mils thick of P type silicon single crystal of resistivity 0.36 ohm cm. was heated in contact with a particle of lithium for 25 seconds at 800° C. in helium and quenched as described. After etching 3 times for 3 seconds each in a mixture of nitric and hydrofluoric acids and rinsing in distilled water, gold wires were welded electrically to the N and P regions. Excellent electrical properties were observed as shown by table below:

| Voltage | Current (ma.) | |
|---|---|---|
| | Forward | Reverse |
| 0.4 | 0.5 | ---------- |
| 0.5 | 2.0 | ---------- |
| 0.9 | 10.0 | ---------- |
| 1.0 | 13.0 | 0.00005 |
| 5.0 | (400.0) | 0.00010 |
| 10.0 | ---------- | 0.00010 |
| 50.0 | ---------- | 0.00200 |
| 100.0 | ---------- | 0.01500 |
| 175.0 | ([1]) | ([1]) |

[1] Zener breakdown.

In still another example prepared as described in the example immediately above except that P type silicon of 0.066 ohm cm. was employed, similarly excellent rectification was observed with a Zener breakdown occurring at −155 volts, twenty volts lower than in the previous example where higher resistivity silicon was used. In this case heating was at 897° C. for two minutes.

Figure 3:
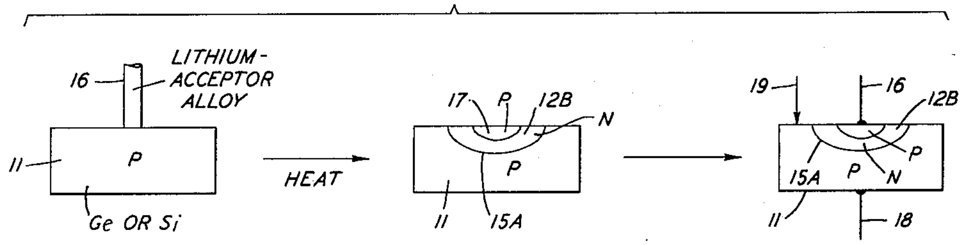
Fig. 3 represents another embodiment of this invention involving the diffusion of both lithium and a significant impurity into the semiconductor.

Fig. 3 illustrates another embodiment of this invention wherein a hook collector of the general character disclosed in Patent 2,569,347 granted September 25, 1951 to W. Shockley is produced. A wire 16 containing both lithium and an acceptor impurity having a diffusion constant in germanium and silicon substantially smaller than that for lithium is mounted in engagement with the semiconductive body 11. The wire may be, for example, of lithium (5 per cent)–indium (95 per cent) alloy. The assembly is heated in an inert atmosphere at a temperature of say 600° C. Both indium and lithium enter into the body 11 but because of the greater diffusivity of lithium there are formed an N conductivity type zone 12B and a P type island 17 in the N zone. A collector connection 16 is made to the island 16, a base connection 18 to the P body 11 and a point contact emitter connection 19 is made to the body adjacent the junction 15A.

Figure 4:
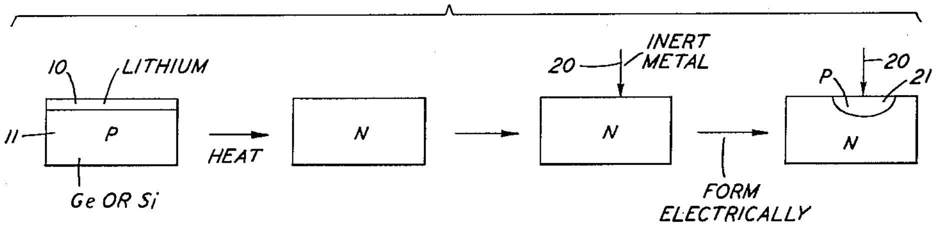
Fig. 4 illustrates the fabrication of an N type rectifier in accordance with the method of this invention.

In the embodiment of this invention depicted in Fig. 4, a coating 10 of lithium is applied as from a vapor to one or more surfaces of the silicon or germanium body 11 and the assembly is heated in an inert atmosphere to diffuse lithium into the body for a time and at a temperature to convert the entire body to N conductivity type. Following this a point contact 20 of an inert metal, such as tungsten, is brought to bear against the body and is formed electrically, that is current pulses are applied between the contact and the body. As a result, lithium diffuses out of the body into the wire whereby a P type region 21 is produced.

Although specific embodiments of this invention have been shown and described, it will be understood that they are but illustrative and that various modifications may be made therein without departing from the scope and spirit of this invention. For example, although the lithium as such is described as placed upon the semiconductor, similar results to those described may be realized by heating the semiconductor in a vapor of lithium.

What is claimed is:

1. The method of fabricating a semiconductive body which comprises heating a body of P type semiconductive material selected from the group consisting of silicon and germanium in the presence of lithium at a temperature between about 500° C. and the melting point of said material.

2. The method of producing a PN junction which comprises applying lithium to a body of P type semiconductive material selected from the group consisting of germanium and silicon, and heating the combination in an inert atmosphere at a temperature between about 600° C. and 1000° C. for a time of the order of seconds.

3. The method of producing a PN junction which comprises applying lithium to a body of P type germanium having a resistivity of the order of one ohm cm., heating the body in an inert atmosphere at a temperature of the order of 800° C., and then quenching said body.

4. The method of producing a PN junction which comprises applying lithium to a body of P type, silicon having a resistivity of the order of one-half ohm cm., heating the body in an inert atmosphere at a temperature of the order of 900° C., and then quenching said body.

5. The method of fabricating a semiconductor signal translating device which comprises placing a wire containing lithium and an acceptor impurity in contact with a body of P type semiconductive material selected from the group consisting of silicon and germanium, and heating the wire and body to diffuse lithium and said impurity into a surface portion of said body.

6. The method of fabricating a semiconductor signal translating device which comprises diffusing lithium into a body of P type semiconductive material selected from the group consisting of germanium and silicon, thereby to convert said body to N type, placing an inert metal contact in engagement with said body, and passing current pulses through said contact and body.

References Cited in the file of this patent

UNITED STATES PATENTS

| | | |
|---|---|---|
| 2,560,594 | Pearson | July 17, 1951 |
| 2,561,411 | Pfann | July 24, 1951 |
| 2,617,865 | Bardeen et al. | Nov. 11, 1952 |